United States Patent
Brugger et al.

(10) Patent No.: US 6,438,312 B1
(45) Date of Patent: Aug. 20, 2002

(54) APPARATUS FOR TEMPORARILY FIXING LIGHT WAVEGUIDE ENDS IN A DEFINED POSITION

(75) Inventors: Rudolf Brugger, Puchheim; Dieter Krause, Uffing am Staffelsee, both of (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/762,389
(22) PCT Filed: Jul. 5, 1999
(86) PCT No.: PCT/DE99/02084
§ 371 (c)(1),
(2), (4) Date: Feb. 6, 2001
(87) PCT Pub. No.: WO00/08497
PCT Pub. Date: Feb. 17, 2000

(30) Foreign Application Priority Data

Aug. 6, 1998 (DE) .......................... 198 35 642

(51) Int. Cl.⁷ .................................................. G02B 6/00
(52) U.S. Cl. ........................................................ 385/136
(58) Field of Search ............................. 385/52, 97, 98, 385/136, 137

(56) References Cited

U.S. PATENT DOCUMENTS

| 5,020,874 A | | 6/1991 | Zell et al. | |
| 5,318,419 A | | 6/1994 | Tanabe | |
| 5,602,951 A | * | 2/1997 | Shiota et al. | 385/81 |
| 5,835,660 A | * | 11/1998 | Jung et al. | 385/137 |
| 5,915,055 A | * | 6/1999 | Bennett et al. | 385/59 |
| 5,984,530 A | * | 11/1999 | Shahid | 385/55 |
| 6,052,500 A | * | 4/2000 | Takano et al. | 385/50 |
| 6,317,964 B1 | * | 11/2001 | Robertsson et al. | 29/601 |
| 6,327,405 B1 | * | 12/2001 | Leyva et al. | 385/37 |

FOREIGN PATENT DOCUMENTS

| EP | 0 211 221 | 2/1987 |
| EP | 0 340 867 | 11/1989 |
| EP | 0 475 474 | 3/1992 |

* cited by examiner

Primary Examiner—Brian Sircus
Assistant Examiner—Thanh-Tam Le
(74) Attorney, Agent, or Firm—Harness, Dickey & Pierce, P.L.C.

(57) ABSTRACT

In order to fix mutually parallel light-guide ends in a clamping device, it has to be ensured, when using a standard clamping device for different numbers of light-guide ends, that the clamping device is positioned differently depending on the number of light-guide ends. Prior-art apparatuses are of very complex design and are difficult to use. The invention specifies an apparatus which is of straightforward design and in which, depending on the number of light-guide ends which are to be clamped, the clamping devices is fitted in each case in mounts assigned to the number of light-guide ends. The mounts are advantageously arranged here in the form of a centering body which, by rotation through 90° in each case about its longitudinal axis and/or through 180° about a transverse axis perpendicular to said longitudinal axis, is brought into a total of eight different positions. This provides fixedly predetermined mounts for a total of eight different numbers of light-guide ends.

6 Claims, 1 Drawing Sheet

APPARATUS FOR TEMPORARILY FIXING LIGHT WAVEGUIDE ENDS IN A DEFINED POSITION

BACKGROUND OF THE INVENTION

The invention relates to an apparatus for temporarily fixing light-guide ends in a defined position in a clamping device for the subsequent further processing of the light-guide ends in a machining tool.

EP 0 475 474 A1 discloses that, before two light-guide ends are spliced together, the two light-guide ends have to be adjusted precisely in relation to one another in order for the additional optical losses to be reduced. Since the adjustment of individual light-guide ends is very time-consuming, a plurality of light-guide ends are adjusted in relation to one another at the same time here. In this case, either use is made of fiber bundles in which individual light-guide ends are fixed parallel to one another, or individual light-guide ends are aligned parallel to one another in one plane before the splicing operation. The predetermined sheath diameter of 250 $\mu$m for the individual light guides gives a corresponding spacing between the individual light guides. Following the alignment, the light-guide ends are fixed in a clamping device. This clamping device is then fitted into a splicing apparatus, and a second group of light-guide ends are also prepared in a second clamping device, which is likewise fitted into the splicing device. The mutually parallel light-guide ends, of which there is a relatively large number, are then jointly adjusted and spliced. In order that standard clamping devices can be used for different numbers of light-guide ends, the position of the mutually parallel light-guide ends in the clamping devices is to be adapted to the number of light-guide ends. Known for this purpose are sorting apparatuses of complex design which provide a ball slide with a micrometer screw for the different fitting positions of the light-guide ends positioned in relation to one another.

SUMMARY OF THE INVENTION

The object of the invention is to specify an apparatus which is intended for temporarily fixing light-guide ends in a defined position in a clamping device for the subsequent further processing of the light-guide ends in a processing tool and which is of straightforward design and is easy to use.

This object is achieved by an apparatus having a fixing device with means for positioning a plurality of light waveguides, such as optical fibers, in a defined or fixed position side-by-side and parallel in one plane, a clamping device for holding the light waveguide ends, which clamping device is insertable into a mount of the fixing device and can be brought to a definite position in relation to the fixed light waveguide ends by a stop arrangement of the mount, the improvement comprising the fixing device and the mount having centering means which are assigned to one another and can abut against one another and that a plurality of changeable mounts are provided and can be inserted alternately into the fixing device, the stop means of the different mounts varying in a stepwise manner in their position transverse to the light waveguide ends, so that the clamping device can be adapted to a different number of fixed light waveguide ends by adjusting the stop means transversely to the light waveguide ends.

It is provided here that the clamping device can be inserted into a mount of the fixing device, and the fixing device and the mount have centering means which are assigned to one another and can butt against one another. Provided in this case are quickly changeable mounts for different numbers of light-guide ends, the different mounts having stop means which vary in a stepwise manner in their position transverse to the light-guide ends. This makes it possible, depending on the number of light-guide ends which are to be fixed, for the corresponding mounts to be selected and fitted quickly into the mount of the fixing device.

It is particularly advantageous to combine different mounts in one centering body which, can be inserted into the fixing device in different rotary positions. The centering body can assume up to eight different rotary positions and thus provide up to eight different mounts. This does away with high-outlay storage of different mounts.

The apparatus advantageously has a fiber-guide slot into which an associated fiber slide can be introduced in order to align the light-guide ends parallel in one plane and in a closely adjacent manner to one another.

For straightforward use of the apparatus, the apparatus provides a comb-like sorting element which is mounted rotatably between two positions, with the result that, in a first position, the fibers are fixed in the fiber-guide slot and, in the second position, they are clamped in the clamping device.

The invention will be explained in more detail by way of an exemplary embodiment and with reference to the drawings.

DESCRIPTION OF THE PREFERRED EMBODIMENT

Figure 1:
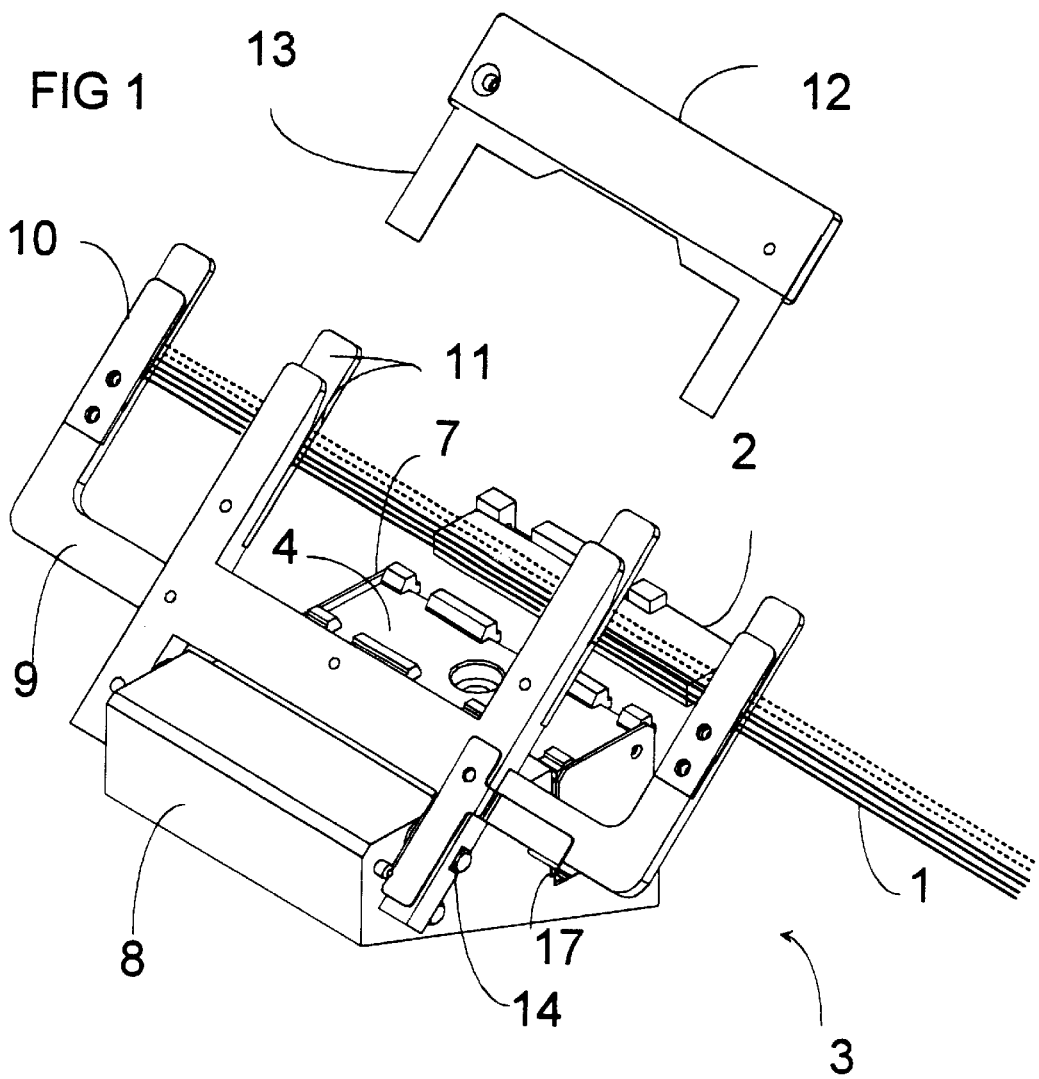
FIG. 1 is a perspective view of the apparatus according to the invention.

FIG. 1 illustrates how—in this example four—light-guide ends 1 are aligned parallel to one another and clamped on a clamping device 2. The light-guide ends here may be, for example, glass fibers or plastic fibers. Further light-guide ends 1 are indicated by dashed lines, and these indicate that different numbers of light-guide ends can be fixed by the apparatus according to the invention. On a top surface or side, the clamping device 2 has V-grooves (not illustrated) at a unit spacing of 250 $\mu$m, in order that the light-guide ends which are to be clamped are clamped in the clamping device parallel to one another and in a closely adjacent manner.

Figure 2:
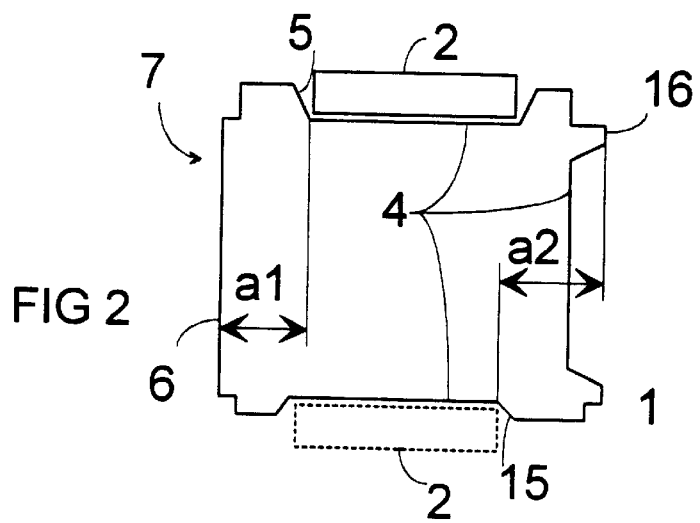
FIG. 2 shows a schematic side view of a centering body.

The clamping device 2 is mounted on a mount 4 in the fixing device 3. As is illustrated in FIG. 2, the mounts 4 are arranged in the form of a centering body 7. The clamping device 2 is retained here by stop means 5, 15 arranged on the centering body 7. The position of the centering body 7 in relation to the fixing device 3 is determined by centering means 6, 16 on the centering body and centering means 17 of the fixing device 3. In the example illustrated, the respective centering means 6, 17 butt against one another. The cuboidal centering body 7 is constructed such that the individual mounts 4 are arranged such that the respectively associated stop means 5, 15 are spaced apart from the respectively associated centering means 6, 16 by different spacings a1, a2. This allows the centering body 7 to be fastened in different positions in the fixing device 3. These spacings a1, a2, which differ in a stepwise manner, ensure that, even with different numbers of light-guide ends 1, the light-guide ends 1 are clamped in the central V-grooves of the clamping device 2.

In the example illustrated, a clamping device 2 is retained on a first stop means 5 and said stop means 5 is spaced apart from the first centering means 6 by a spacing a1. If the centering body 7 is then installed in the fixing device 3 in a state in which it has been rotated, for example, through 180° about its longitudinal axis, the clamping device 2 (illustrated by dashed lines) is retained on a second stop means 15, which is spaced apart from the second centering means 16 by a spacing a2. By a corresponding arrangement of the centering and stop means of the cuboidal centering body, it is thus possible to realize up to eight different spacings a1, a2. In this case, the centering body is rotated in each case through 90° about its longitudinal extent and/or through 180° about a transverse axis perpendicular to said longitudinal extent. In the example illustrated in FIG. 2, a total of six different spacings are realized in order to fix, for example, two, four, six, eight, ten and twelve light-guide ends.

The procedure for the temporary fixing in a defined position then takes place as follows. First of all, depending on the number of light-guide ends 1 which are to be fixed, the desired position of the centering body 7 is determined and the centering body 7 is correspondingly installed in the fixing device 3. Then the clamping device 2, which is standard for different numbers of light-guide elements 1, is fitted into the mount 4 of the centering body 7. The light-guide ends 1 which are to be fixed are clamped into a fiber clip 10 and introduced into a fiber-guide slot 11 of the fixing device 3. In order that the individual light-guide ends 1 are aligned parallel to one another in a closely adjacent manner, a slide 13 of a fiber slide 12 is introduced into the fiber-guide slot 11. The fiber slide 12 is magnetically attracted here by the comb-like sorting element 9, the slide 13 pressing on the light-guide ends 1 in a resilient manner. The comb-like sorting element 9 is then rotated about a rotary bearing 14, with the result that the fixed light-guide ends 1 on the clamping device 2 come to rest in the V-grooves (not illustrated). The light-guide ends 1 are clamped there. After this, the fiber clips 10 are opened, the fiber slide 12 is drawn out, the comb-like sorting element 9 is pivoted upward and it is possible to remove the clamping device 2 with the clamped light-guide ends 1.

The clamped light-guide ends 1 may then undergo joint further processing. For example, it is possible for them to be fitted in different processing tools and, depending on the processing tool, made jointly to be of the same length, for the sheath to be removed and for them to be adjusted jointly in relation to another, correspondingly prepared fiber bundle and then to be welded to this second fiber bundle.

Instead of individual light-guide ends 1, the apparatus is also suitable for temporarily fixing in a defined position light-guide bundles (fiber bundles) with—in this example— up to twelve individual light guides 1.

We claim:

1. An apparatus for temporarily fixing light waveguide ends in a defined position parallel one beside the other in one plane in a clamping device, said apparatus comprising a fixing device having means for positioning a plurality of light waveguides in a fixed position side-by-side and parallel, at least one mount, a clamping device inserted into the mount to be brought into a defined position in relation to the light waveguides in the fixed position, the mount and fixing device having stop means, the fixing device and mount having centering means which are assigned to one another and can abut against one another, a plurality of changeable mounts being provided and being inserted alternately into the fixing device with the stop means of the different mounts varying in a stepwise manner in the position transverse to the light waveguides, so that a different number of fixed light waveguide ends can be positioned by the stop means to be adjusted transversely to the light waveguide in the clamping device.

2. An apparatus according to claim 1, wherein the different mounts are combined in one centering body which can be inserted into the fixing device in different rotated positions with the stop means being positioned differently in each of the different rotated positions.

3. An apparatus according to claim 2, wherein the means for positioning has at least one fiber guide slot provided with a fiber slide, said guide slot positioning the light waveguide ends parallel to each other in one plane and the slide holding the waveguides in the fiber guide slot in such a close adjacent manner to one another that the individual light waveguide ends are in contact with one another.

4. An apparatus according to claim 3, wherein the at least one fiber guide slot is arranged in a comb-like sorting element, which is mounted for rotation on the fixing device between two positions with the result that, in the first position, the fibers are fixed in the fiber guide slots and, in the second position, they are clamped in the clamping device.

5. An apparatus according to claim 1, wherein the means for positioning includes at least one fiber guide slot and a fiber slide, said guide slot positioning the light waveguides in one plane and parallel to each other, said fiber slide holding the waveguides in such a close adjacent manner to one another that the individual light waveguide ends are in contact with one another.

6. An apparatus according to claim 5, wherein the one fiber guide slot is arranged in the comb-like sorting element, which is mounted rotationally between two positions on said fixing device with the first position allowing positioning the waveguides in the fiber guide slot and a second position locating the waveguides for clamping by the clamping device.

* * * * *